United States Patent [19]

Abe et al.

[11] Patent Number: 5,677,024

[45] Date of Patent: Oct. 14, 1997

[54] LAMINATE HAVING IMPROVED POLARIZATION CHARACTERISTICS AND RELEASE FILM USED THEREFOR

[75] Inventors: Reizo Abe, Tokyo; Kazunori Tanaka, Anpachi-cho, both of Japan

[73] Assignee: Teijin Limited, Osaka, Japan

[21] Appl. No.: 350,167

[22] Filed: Nov. 30, 1994

Related U.S. Application Data

[63] Continuation-in-part of Ser. No. 275,457, Jul. 15, 1994, abandoned.

[30] Foreign Application Priority Data

Jul. 19, 1993 [JP] Japan .................. 5-178092
Aug. 13, 1993 [JP] Japan .................. 5-201462

[51] Int. Cl.$^6$ .................. C09K 19/00
[52] U.S. Cl. .................. 428/40.1; 359/63; 359/64; 359/65; 359/93; 428/1; 428/41.7; 428/41.8; 428/352; 428/354; 428/480; 428/483
[58] Field of Search .................. 428/1, 40, 41, 428/352, 354, 480, 483; 359/63, 64, 65, 93

[56] References Cited

U.S. PATENT DOCUMENTS

| | | | |
|---|---|---|---|
| 3,908,052 | 9/1975 | Sanders | 428/1 |
| 4,313,988 | 2/1982 | Kohar | 428/40 |
| 4,386,135 | 5/1983 | Campbell | 428/447 |
| 4,387,133 | 6/1983 | Ichikawa | 428/1 |
| 4,623,710 | 11/1986 | Takase | 528/176 |
| 4,738,880 | 4/1988 | Asada | 428/1 |
| 5,082,704 | 1/1992 | Higgins | 428/40 |

FOREIGN PATENT DOCUMENTS

| | | |
|---|---|---|
| 430104A | 2/1992 | Japan . |
| 430120A | 2/1992 | Japan . |
| 432805 | 2/1992 | Japan . |
| 5107149 | 4/1993 | Japan . |
| 5157914 | 6/1993 | Japan . |
| 63664 | 1/1994 | Japan . |

OTHER PUBLICATIONS

Patent Abstracts of Japan vol. 010, No. 348 (P-519) 22 Nov. 1986 & JPA 61 148 403 (Toray Ind Inc) 7 Jul. 1986.
Patent Abstracts of Japan vol. 010 No. 149 (P-461) 30 May 1986 & JPA 61003338 (Toray KK) 9 Jan. 1986.
Database WPI Week 9321, Derwent Publ.Ltd., London, GB; AN 93-173156 (21) & JPA 5107149 (Nitto Denko Corp.) 27 Apr. 1993.
Database WPI Week 9209, Derwent Publ. Ltd., London, GB; AN 92-068198 (09) & JPA 4 011 203 (Toray Ind Inc) 16 Jan. 1992.
Patent Abstracts of Japan vol. 011, No. 015 (P-536) 16 Jan. 1987 & JPA 61189506 (Nitto Electric Ind. Co Ltd.) 23 Aug. 1986.
Database WPI Week 9407, Derwent Publ. Ltd., London, GB; AN 94-051234 (07) & JPA 6003664 (Toyobo KK) 14 Jan. 1994.

*Primary Examiner*—Nasser Ahmad
*Attorney, Agent, or Firm*—Sherman and Shalloway

[57] ABSTRACT

A laminate having improved polarization characteristics, in which an adhesive layer is formed on one surface of a polarizing film, a retarded polarizing film or a retardation film and a release film having a transparent biaxially oriented aromatic polyester film as a base film is formed on the surface of the adhesive layer, said laminate being situated such that (1) a direction of an orientation main axis, as measured by a microwave transmission-type molecular orientation meter, of the biaxially oriented aromatic polyester film in the release film and (2) a direction of an orientation axis of the polarizing film, the retarded polarizing film or the retardation film are substantially the same or substantially form an angle of 90°. The laminate of this invention makes it easy to find foreign matter or defects by the visual inspection of the polarizing film, the retarded polarizing film or the retardation film of a large-sized TFT system or STN system.

15 Claims, 1 Drawing Sheet

LAMINATE HAVING IMPROVED POLARIZATION CHARACTERISTICS AND RELEASE FILM USED THEREFOR

CROSS-REFERENCE TO RELATED APPLICATION

This application is a continuation-in-part of application Ser. No. 08/275,457 filed Jul. 15, 1994 now abandoned, and priority is claimed therefrom.

FIELD OF THE INVENTION

This invention relates to a laminate having improved polarization characteristics, and a release film which can be used therefor. More specifically, the invention relates to a laminate having a structure that an adhesive layer is formed on one surface of a polarizing film, a retarded polarizing film or a retardation film and a release film is laminated on the surface of the adhesive layer, and having excellent polarization characteristics and making it easy to visually inspect foreign matter; and to a release film which can be used therefor.

PRIOR ART

In recent years, there has been advanced a technology for a liquid crystal display (LCD) having high performance and high image quality and being colored and large-sized. Moreover, LCD can be lighter in weight and lower in energy consumption than a cathode ray tube (CRT). Accordingly, LCD has been widely employed as a display for note-type personal computers and word processors, and use of LCD has rapidly spreaded and remarkably grown.

For further growth of the liquid crystal display (LCD), however, a rationalization of cost forms an important factor. Especially with a thin film transistor (TFT, active matrix) system or a super twist nematic (STN) system of a large size, occurrence of unacceptable products is great, and therefore, a reduction in cost by improving the yield is urgently demanded.

In the liquid crystal display (LCD), a polarizing film, a retarded polarizing film and a retardation film are necessary and important parts for providing a density of a transmitted light and changing a color shade of the transmitted light in LCD. For these films, stable maintenance of qualities is also an important subject, and criterions for inspections in production process, qualities and shipment of products have been increasingly severe.

The polarizing film, the retarded polarizing film and the retardation film are each provided for LCD by punching or cutting a roll of a laminate that is prepared by forming an adhesive layer on one surface of a polarizing substrate and then laminating a release film on the adhesive layer, to desired sizes. One of the important items in inspection of these films is an inspection of incorporation and adhesion of foreign matter. The control of foreign matter is important in all steps including not only a step of producing a polarizing film but also a step of adhesion-laminating with a release film, a die-cutting step, and a step of aging, shipment and packaging.

However, inspection of foreign matters in the final inspection step is visual inspection by an operator according to a crossed Nicol's method (which coincides with a method in which stretch axes of two polarizing films are crossed at right angles, a release film is placed therebetween and foreign matters are observed with a transmitted light). Especially, in large-sized LCD, exact visual inspection is hindered at times because of an optical anisotropy of a biaxially oriented aromatic polyester film which is a base film of a release film. Therefore, incorporation of foreign matter is very often overlooked.

PROBLEMS THE INVENTION SEEKS TO SOLVE

There has been used a biaxially oriented aromatic polyester film, especially a biaxially oriented polyethylene terephthalate film, as a base film of a release film which has a good balance of mechanical and thermal characteristics in longitudinal and transverse directions at the time of filmforming. And the direction of the crystal orientation main axis of said film does not coincide with either the longitudinal or transverse direction of the film, and is nearly in the middle between both the directions. Further, the direction of the crystal orientation main axis of said film greatly changes depending on the position of the film transverse (width) direction. This change occurs by a bowing phenomenon, and becomes greater toward both ends than at the center.

On the other hand, the polarizing film, the retarded polarizing film and the retardation film are formed using a monoaxially oriented polarizing film, and the direction of the orientation axis is generally a longitudinal direction.

When the long polarizing film or retardation film is laminated with the rolled release film, the directions of the orientation axes of both the films are deviated, and the crystal orientation main axis of the width direction of the release film gradually changes in a range extending from the center to the width direction. Especially the deviation is greater toward both ends. For this reason, in the visual inspection of foreign matter by a crossed Nicol's method on the obtained laminate, a color of a coherent light occurs, and the degree of this occurrence is stronger toward both ends.

When the width of the laminate is narrow, in other words, when LCD is small-sized, the visual inspection of foreign matter can accurately be conducted to some extent even if the color of the coherent light is somewhat present. However, when the width of the laminate is great, in other words, when LCD is large-sized, it is quite difficult to check all foreign matter by the visual inspection of foreign matter.

An object of this invention is to provide a release film which, when laminated with a polarizing film, a retarded polarizing film or a retardation film, does not substantially permit occurrence of a color of the coherent light, makes easy the visual inspection of foreign matter by a crossed Nicol's method, and prevents overlooking of foreign matter as much as possible especially in large-sized LCD, whereby accuracy of the visual inspection of foreign matter is increased to prevent occurrence of unacceptable products, as well as to provide a laminate having improved polarization characteristics which is obtained by laminating the release film with the polarizing film, the retarded polarizing film or the retardation film.

MEANS FOR SOLVING THE PROBLEMS

According to the present inventors' studies, it has been found that the object of this invention is accomplished by a laminate having improved polarization characteristics, in which an adhesive layer is formed on one surface of a polarizing film, a retarded polarizing film or a retardation film and a release film having a transparent biaxially oriented aromatic polyester film as a base film is formed on the surface of the adhesive layer, wherein said laminate is situated such that (1) a direction of an orientation main axis, as measured by a microwave transmission-type molecular orientation meter, of the biaxially oriented aromatic polyester film in the release film and (2) a direction of an orientation axis of the polarizing film, the retarded polarizing film or the retardation film are substantially the same or form substantially an angle of 90°.

According to this invention, there is further provided a release film for inspection of a polarizing film, a retarded polarizing film or a retardation film, wherein releasability is imparted to at least one surface of the transparent biaxially oriented aromatic polyester film by silicone coating, said biaxially oriented aromatic polyester film having an MOR value, as measured by a microwave transmission-type molecular orientation meter, of 1.3 to 1.8.

Hereinafter, first the release film used in the laminate in this invention and then the laminate having improved polarization characteristics will be explained in more detail.

Typical examples of the biaxially oriented aromatic polyester film used as the base film of the release film in this invention include a polyethylene terephthalate film and a poly-2,6-naphthalenedicarboxylate film. Of these, the polyethylene terephthalate film is more practical.

The transparent biaxially oriented aromatic polyester film used as the base film of the release film in this invention has the MOR (maximum oriented ratio) value, as measured by a microwave transmission-type molecular orientation meter, of 1.3 to 1.8, preferably 1.35 to 1.75. Regarding the MOR value, it is required that the MOR values measured in three points in the width direction of the film all satisfy the above range. The measuring points are three points, i.e., a central point and ⅕ points from each end between the central point and both ends of the film in the width direction of the film (the direction at right angles with the direction of the orientation main axis measured by the microwave transmission-type molecular orientation meter). That is, the MOR values are measured at three points which are distant by 10%, 0% and 90% from one end in a straight line in the width direction of the film.

In the width direction of the film, the MOR values are measured in the above three points. On the other hand, in the length direction (a direction at right angles with the width direction) of the film, the MOR values are measured at intervals of 1.0 to 5 times, preferably 2 to 3 times the width of the film, for example.

The MOR value here referred to is a ratio of a maximum value and a minimum value (maximum value/minimum value) of a transmitted microwave intensity measured by the transmission-type molecular orientation meter. A film having a smaller difference between the stretch ratios in the longitudinal and transverse directions, i.e., a film having a better balance shows a lower MOR value. Whereas, a film having a larger difference between said stretch ratios, i.e., a film having a higher stretching strength in one direction shows a higher MOR value. The MOR value which is lower or higher than the above range is undesirable.

The MOR (maximum oriented ratio) value tends to change in the width direction of the film. The difference of the MOR values in the above three points (difference between the maximum and minimum values) is preferably 0.2 or less, especially preferably 0.15 or less.

As described above, in the base film of the release film in this invention, the range of the MOR value and the range of the difference between the maximum and minimum values satisfy the above conditions, and further it is advisable that a retardation (R) value defined by the following formula (1) is at least 1,200 nm.

$$R = \Delta n \cdot d \quad (1)$$

wherein $\Delta n$ is a difference (nx−ny) between a refractive index (nx) in a width direction of the film and a refractive index (ny) in a direction at right angles with the width direction of the film in a visible light having a wavelength (λ) of 589 nm, and d is a thickness (nm) of the film.

The biaxially oriented aromatic polyester film is a birefringent substance. When a light enters, an incident light spreads as two linear polarized lights whose vibrated surfaces intersect at right angles. The difference of the two linear polarized lights (normal light and abnormal light) is called retardation (R). This retardation affects an inspection step of a polarizing film as a coherent color.

According to a pattern of a coherent color modified by Michel-Levy in crossed Nicols (prepared by a polarization microscope), a coherent light is within a dark sight (black) in a low retardation region. In proportion to the retardation, the coherent light changes the color: yellow→red→purple→blue→green. Then, the color returns to yellow, and this color change is repeated in the same cycle. However, according to the studies in this invention, it has been found that when retardation (R) exceeds about 1,200 nm, the density of the coherent color sharply decreases, and hence that when retardation (R) is high enough, the coherent color is too dim to prevent the visual inspection. Consequently, it has been found that the range of the optical retardation (R) value is preferably 1,200 nm or more, and in case of a biaxially oriented aromatic polyester film having usually a thickness of 25 to 50 μm, the most preferred range of the R value is 1,300 nm or more.

To prove this requirement, a ratio of an amount of a transmitted light (I) and an amount of an incident light ($I_o$) ($I/I_o$) under crossed Nicols of a transparent film having birefringence is generally expressed by the following formula.

$$(I/I_o) = \sin^2(2\Theta) \cdot \sin^2(\pi \cdot \Delta n \cdot d/\lambda) \quad (2)$$

In crossed Nicols of a transparent film having birefringence, a ratio of an amount of a transmitted light and an amount of an incident light is closer to an extinction level when an angle of a birefringent substance present between the crossed Nicols (Θ: corresponding to an orientation angle in this invention) is smaller.

The conditions for the above ratio to be closer to the extinction level are the following two, (a) and (b).

(a) Θ is small.

(b) $\Delta n \cdot d/\lambda = R/\lambda$ is a natural number 1, 2, 3, ... (R is integral times as large as a light source wavelength:λ)

As the orientation angle Θ is closer to 0, the ratio in the formula (2) is closer to 0, or closer to the extinction level. Thus, foreign matter float white, whereby an efficiency of the visual inspection is extremely increased. At the same time, retardation R is preferably about a double of 590 nm which is an average of 420 nm and 760 nm of a wave range of a visible light. When (R) is 1,200 nm, the ratio is much closer to the extinction level under the transverse orientation condition with the small orientation angle Θ. When retardation (R) is more than 1,200 nm, the density of the coherent light comes to sharply decrease in the pattern of the coherent light in the crossed Nicols. Accordingly, R≧1,200 nm is a preferable condition in the visual inspection of foreign matters.

The upper limit of retardation (R) varies with the thickness of the film. With the thickness of 25 to 50 μm, it is unnecessary to set the upper limit in particular.

The biaxially oriented aromatic polyester film as the base film preferably has the following characteristics besides the aforesaid characteristics.

(1) Transparency suited for visual inspection of appearance. Flatness for making the adhesive surface uniform.

(2) Heat resistance, high strength, high elongation and high modulus of elasticity that permit to withstand coating of an adhesive and lamination with a polarizing film which are conducted under heat with high tension; specifically, the following elongation at break, modulus of elasticity and heat shrinkage.

Elongation at break of the film:
  Length direction—150 to 250%
  Width direction—50–150%

Modulus of elasticity of the film:
  Length direction—450 to 550 kg/mm$^2$
  Width direction—550 to 650 Kg/mm$^2$ Heat shrinkage of the film:
  Length direction—0.4% or less
  Width direction—0.3% or less (110° C.×30 min.)

(3) Dimensional stability that does not allow occurrence of tunneling (delamination phenomenon) or curling which is caused by deviation with an interface of an adhesive due to heat shrinkage of a release film.

(4) Cleaning level which is applicable to an optical usage (absence of harmful foreign matter, adhering dusts, etc.), i.e., 0 to 100 foreign matter/10 inch$^2$.

(5) Thickness of 25 to 50 μm.

The biaxially oriented aromatic polyester film can be produced by the following method with the following stretching ratios. That is, said film is stretched at least three times in both the longitudinal and transverse directions; the stretch ratio in the longitudinal direction is preferably at least 0.5, more preferably at least 0.7 higher than that in the transverse direction, or the stretch ratio in the transverse direction is preferably at least 0.5, more preferably at least 0.7 higher than that of the longitudinal direction.

It is preferable that the stretch ratios in the longitudinal and transverse directions of the film do not exceed 6.

The biaxial stretching may be carried out by simultaneous biaxial stretching or consecutive biaxial stretching. The latter is preferable. It is advisable that in the thermosetting treatment after the biaxial stretching, treatment of imparting isotropy is conducted to decrease bowing on the whole width of the film. In the biaxially stretched, thermoset film, a heat shrinkage given when the film is maintained at 150° C. for 30 minutes (under no load) is preferably 4% or less in both the longitudinal and transverse directions.

The treatment of imparting releasability to at least one surface of the biaxially oriented aromatic polyester film is not limited in particular. However, silicone coating treatment is preferable. Especially, treatment of forming a curable silicone resin coating is preferable.

The curable silicone resin coating can be formed by coating a coating solution containing a curable silicone resin on at least one surface of the film, drying the coated film and curing it.

The curable silicone resin includes resins prepared by any reaction such as a condensation reaction or an addition reaction and by curing with a radiation of an ultraviolet or electron beam. They may be used either singly or in combination.

The various silicone curing methods are schematically shown below.

Condensation reaction

wherein A denotes a lower alkyl group.

Addition reaction

Ultraviolet or electron beam curing reaction

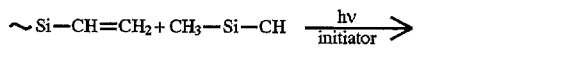

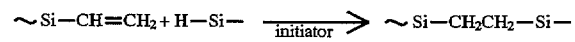

The silicone resin of the condensation reaction system includes, for example, a resin obtained by condensing polydimethylsiloxane having a terminal —OH group with polydimethylsiloxane having a terminal —H group (hydrogen silane) in the presence of an organotin catalyst (e.g., an organotin acylate catalyst) to form a three-dimensionally crosslinked structure.

The silicone resin of the addition reaction system includes, for example, a resin obtained by reacting polydimethylsiloxane in which a vinyl group is introduced at its terminal with hydrogen silane in the presence of a platinum catalyst to form a three-dimensionally crosslinked structure.

The most basic examples of the silicone resin of the ultraviolet curing system include a resin obtained by the same radical reaction as in the ordinary silicone rubber crosslinking, a resin resulting from photosetting by introducing an acrylic group, a resin obtained by decomposing an onium salt with ultraviolet light to generate a strong acid and cleaving an epoxy group with said strong acid for crosslinking, and a resin resulting from crosslinking by an addition reaction of thiol to vinylsiloxane. The electron beam has stronger energy than the ultraviolet light, causing the crosslinking reaction with radicals without using an initiator as in the ultraviolet curing.

A curable silicone resin has a degree of polymerization of about 50 to 200,000, preferably about 1,000 to 100,000. Examples of the curable silicone resin are as follows.

Resins of Shin-etsu Silicone K.K.: KS-718, -774, -775, -778, -779H, -830, -835, -837, -838, -839, -841, -843, -847, -847H, X-62-2418, -2422, -2125, -2492, -2494, -470, -2366, -630, X-92-140, -128, KS-723A-B, 705F, -708A, -883, -709, -719

Resins of Toshiba Silicone K.K.: TPR-6701, -6702, -6703, -3704, -6705, -6722, -6721, -6700, XSR-7029, YSR-3022, YR-3286

Resins of Dow Corning K.K.: DK-Q3-202, -203, -204, -210, -240, -3003, -205, -3057, SFXF-2560

Resins of Toray Silicone K.K.: SD-7226, 7320, 7229, BY24-900, 171, 312, 374, SRX-375, SYL-OFF23, SRX244, SEX-290

Resin of I.C.I. Japan: SILCOLEASE 425

Silicone resins described in Japanese Laid-open Patent Application (Kokai) No. 34,447/1972 and Japanese Patent Publication No. 40,918/1977 can also be used.

When the curable silicone resin coating is formed on the surface of the film, a known coating method can be used. Examples of such coating method are a bar coating method, a doctor blade coating method, a reverse-roll coating method and a gravure coating method.

Drying and curing (heat curing, ultraviolet curing or the like) can be conducted separately or simultaneously. When they are conducted simultaneously, the temperature is preferably at least 100° C. The conditions for drying and heat curing are preferably at least 100° C. and about 30 seconds. When the drying temperature is lower than 100° C. and the curing time is less than 30 seconds, curing of the coating is incomplete, and dropping of the coating occurs, thus making durability unstable.

The thickness of the curable silicone resin coating is not limited in particular. However, it is preferably in the range of 0.05 to 0.5 μm. When the coating is too thin, releasability decreases and satisfactory performance cannot be expected. When the coating is too thick, curing takes much time, inviting disadvantage in production.

In this invention, the above release film is formed on the surface of the adhesive layer on the polarizing film, the retarded polarizing film or the retardation film having the adhesive layer on one surface. At this time, the lamination is conducted such that the adhesive layer is brought into contact with the surface of the curable silicone resin coating film of the release film.

It is required that the laminate of this invention is situated such that a direction of an orientation main axis, as measured by a microwave transmission-type molecular orientation meter, of the biaxially oriented aromatic polyester film in the release film and a direction of an orientation axis of the polarizing film, the retarded polarizing film or the retardation film are substantially the same or substantially form an angle of 90°. Here, "substantially the same" means that both the directions exactly agree with each other or may be slightly deviated to such an extent as not to actually prevent the visual inspection. Deviation of usually 5° or less, preferably 3° or less is permissible.

Generally, an orientation main axis, as measured by a microwave transmission-type molecular orientation meter (hereinafter simply referred to at times as an "orientation main axis"), of the biaxially oriented aromatic polyester film nearly agrees with a longitudinal (length) direction or a transverse (width) direction of the film. Accordingly, for example, the longitudinal direction of the biaxially oriented aromatic polyester film is caused to agree with the longitudinal direction (the length direction; the direction of the orientation axis) of the polarizing film, the retarded polarizing film or the retardation film to meet the conditions of the lamination.

In the laminate of this invention, the orientation main axis of the release film and the orientation axis of the polarizing film, the retarded polarizing film or the retardation film agree with each other or are deviated by 90°, with the result that the color of the coherent light does not occur in the visual inspection of foreign matter according to the crossed Nicol's method, and the foreign matter or defects can therefore easily be detected. When the orientation main axis of the release film and the orientation axis of the film accord with each other, the inspection can be conducted in a bright sight. On the other hand, when both axes are deviated by 90°, the inspection is conducted in a dark sight with a reflected light alone. In either case, foreign matter can easily be inspected. For example, even a product having a length of 900 mm and a width of 600 mm can easily be inspected, and foreign matter or defects are scarcely overlooked.

As the polarizing film, the retarded polarizing film and the retardation film, materials which have been so far known per se and so far used can be employed. Of these, as the polarizing film, the regarded polarizing film and the retardation film, a TFT (active matrix) system and an STN (super twist nematic) system of a large size are preferable.

BRIEF EXPLANATION OF DRAWINGS

In FIG. 1, 1 is a structure of a laminate, 2 is a protective film, e.g. a polyethylene film having a thickness of 50 to 70 μm, 3 is a polarizing film (or a retarded polarizing film or a retardation film) usually having a thickness of 120 to 200 μm, 4 is an adhesive layer usually having a thickness of 20 to 50 μm, 5 is a silicone release layer, 6 is a biaxially oriented aromatic polyester film, 7 is a foreign matter or a defect having a size of 50 to 200 μm which is present in the protective film 2, 8 is a polarizing film for crossed Nicol inspection, 9 is a light source, e.g., two fluorescent lights (20 W), and 10 is an opaque light diffusion film. The laminate 1 consists of the structure from the protective film 2 to the biaxially oriented aromatic polyester film 6, and the release film consists of the silicone release layer 5 and the biaxially oriented aromatic polyester film 6.

Figure 1:
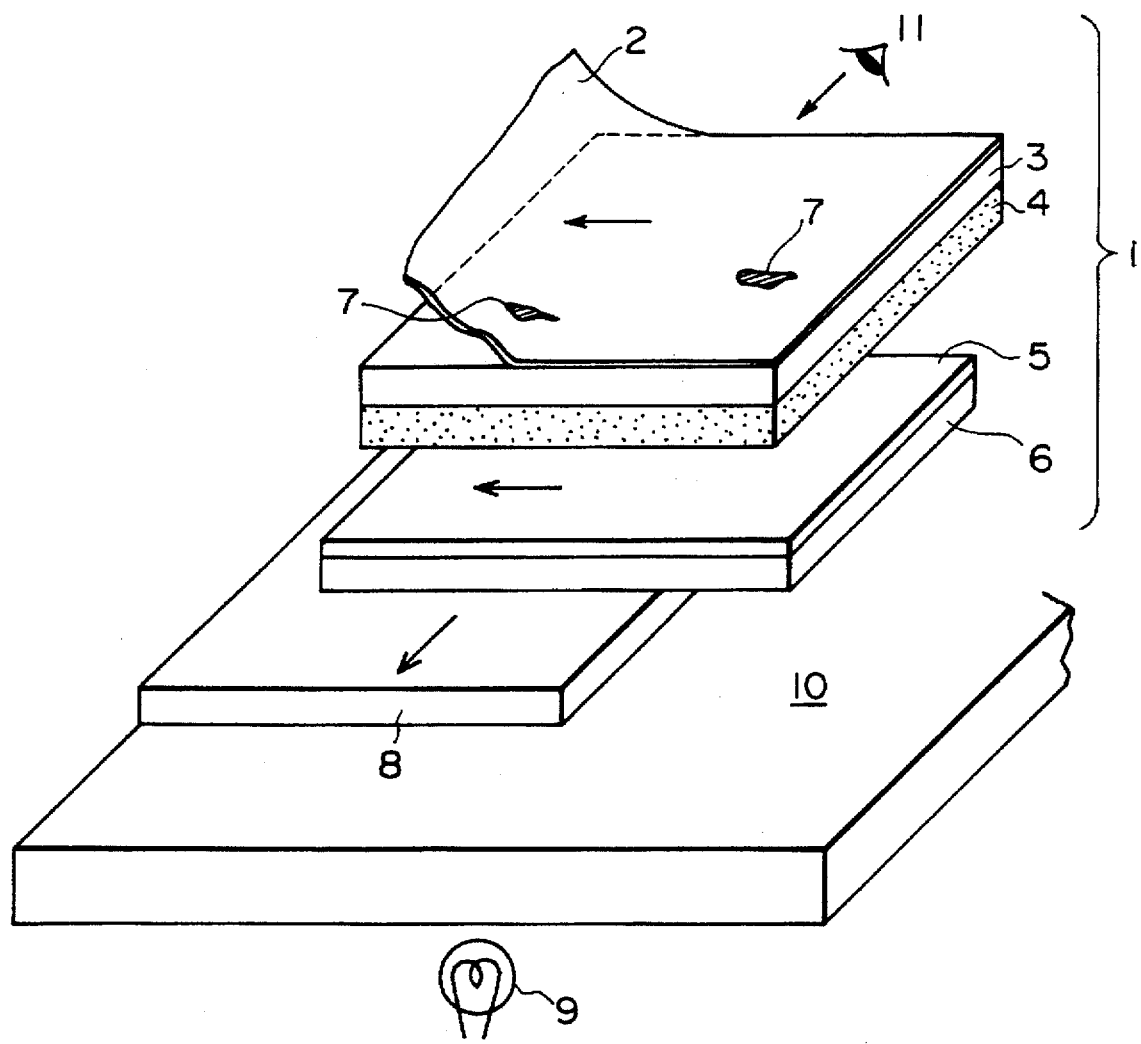
FIG. 1 is a schematic view showing a structure of a laminate and a state of visual inspection in this invention. The FIG. 1 illustrates the order of the films and layers of the materials used in the construction of the laminate.

The foreign matter or the defects which are inspected through the laminate of this invention are present not only in the protective film, as shown in FIG. 1, but also in the polarizing film, the retarded polarizing film, the retardation film, the adhesive layer, the silicone release layer or the biaxially oriented aromatic polyester film, or are present therebetween. At any rate, the foreign matter or the defects in the laminate can easily be found by the visual inspection.

This invention will be explained in more detail by referring to the following Examples and Comparative Examples. The properties in said Examples were measured by the following methods.

(19) MOR value, inclination of an orientation main axis of a crystal (orientation angle)

An MOR value and an inclination of an orientation main axis of a crystal (orientation angle) were determined from a pattern of a transmitted microwave intensity using a microwave molecular orientation meter manufactured by Kanzaki Paper Manufacturing Co., Ltd.

(2) Condition of visual inspection (influence of light interference under crossed Nicol)

The visual inspection was conducted with the structure shown in FIG. 1, and conditions of occurrence of light interference were evaluated with the following grades.

good: Light interference does not occur.

slightly bad: Light interference occurs, but inspection is possible.

bad: Light interference occurs and inspection is impossible.

EXAMPLES 1 to 3 and COMPARATIVE EXAMPLES 1 to 4

Molten polyethylene terephthalate was extruded into a film, and the film was rapidly cooled in contact with a rotary cooling drum at 20° C. to form an unstretched film. The unstretched film was consecutively biaxially stretched at stretch ratios shown in Table 1, and then thermoset under conditions shown in Table 1 to give a transparent biaxially oriented polyethylene terephthalate film having a thickness of 38 μm.

Subsequently, a silicone resin coating solution having the following composition was coated on one surface of the biaxially oriented polyethylene terephthalate film in a coating amount (wet) of 8 g/m². The thus coated film was dried and cured at 130° C. for 30 seconds to obtain a release film having a coating thickness of 0.24 μm.

<Composition of the coating solution>

|  | parts by weight |
|---|---|
| Curable silicone resin (KS847H) | 100 |
| Curing agent (CAT PL-50T, made by Shin-etsu Silicone K.K.) | 2 |
| Diluent: methyl ethyl ketone/ xylene/methyl isobutyl ketone | 898 |

A polyester adhesive tape (NITTOH-31B) was adhered to the release surface of the release film, 5 kg pressure rollers were driven back and forth. After the film was left to stand for 20 hours, a 180° peeling strength of the tape was measured and found to be all within the range of 9 g±2 g/25 mm. Thus, the film had sufficient releasability as a release film for a polarizing film (peeling liner).

Using the release film, a laminate was formed with the structure indicated at 1 in FIG. 1, and was measured for various properties. The results are shown in Table 1.

TABLE 1

| Film-forming Conditons & Film Properties | Unit | Example 1 B | Example 1 C | Example 1 F | Example 2 B | Example 2 C | Example 2 F | Example 3 C | Example 3 F | Comp. EX. B |
|---|---|---|---|---|---|---|---|---|---|---|
| Film formed | | | | | | | | | | |
| Stretch ratio: | | | | | | | | | | |
| longitudinal direction | times | | 3.1 | | | 2.9 | | 3.1 | | 3.1 |
| transverse direction | times | | 4.1 | | | 4.1 | | 4.1 | | 4.1 |
| Crystal thermosetting temp. | | | | | | | | | | |
| zone × 1 | °C. | | 180 | | | 205 | | 230 | | 230 |
| zone × 2 | °C. | | 200 | | | 215 | | 230 | | 230 |
| zone × 3 | °C. | | 180 | | | 180 | | 180 | | 180 |
| Film thickness | μm | | 38 | | | 38 | | 38 | | 38 |
| Film width | mm | | 730 | | | 730 | | 730 | | 730 |
| Silicone Coating | | | | | | | | | | |
| Heat shrinkage (longitudinal) (110° C. × 30 min.) | % | 0.2 | 0.2 | 0.2 | 0.1 | 0.1 | 0.1 | 0.1 | 0.1 | 0.1 |
| Heat shrinkage (transeverse) (110° C. × 30 min.) | % | 0.2 | 0.1 | 0.2 | 0 | 0 | 0 | 0 | 0 | 0 |
| Peeling strength | g/25 mm | 9 | 8 | 9 | 8 | 9 | 9 | 9 | 9 | 8 |
| MOR value | | 1.5 | 1.4 | 1.5 | 1.7 | 1.6 | 1.7 | 1.7 | 1.7 | 1.9 |
| (Maximum MOR value − Minimum MOR value) | | 0.1 | 0.1 | 0.1 | 0.1 | 0 | 0.1 | 0.2 | 0.1 | 0.3 |
| Retardation (R) value | nm | 1220 | 1250 | 1220 | 1450 | 1630 | 1520 | 1200 | 1300 | 1030 |
| State of visual inspection (Influence of light interference under crossed Nicols) | | good | good | good | good | good | good | good | good | slightly bad |

| Film-forming Conditons & Film Properties | Unit | Comp. Ex. 2 B | Comp. Ex. 2 C | Comp. Ex. 2 F | Comp. Ex. 3 B | Comp. Ex. 3 C | Comp. Ex. 3 F | Comp. Ex. 4 C | Comp. Ex. 4 F |
|---|---|---|---|---|---|---|---|---|---|
| Film formed | | | | | | | | | |
| Stretch ratio: | | | | | | | | | |
| longitudinal direction | times | | 2.1 | | | 3.6 | | 3.6 | |
| transverse direction | times | | 4.1 | | | 3.7 | | 3.8 | |
| Crystal thermosetting temp. | | | | | | | | | |
| zone × 1 | °C. | | 180 | | | 180 | | 234 | |
| zone × 2 | °C. | | 200 | | | 200 | | 236 | |
| zone × 3 | °C. | | 180 | | | 180 | | 190 | |
| Film thickness | μm | | 38 | | | 38 | | 38 | |
| Film width | mm | | 730 | | | 730 | | 730 | |
| Silicone Coating | | | | | | | | | |
| Heat shrinkage (longitudinal) (110° C. × 30 min.) | % | 0.1 | 0.1 | 0.2 | 0.2 | 0.1 | 0.2 | 0.1 | 0.1 |
| Heat shrinkage (transeverse) (110° C. × 30 min.) | % | 0.1 | 0.1 | 0.1 | 0.2 | 0.1 | 0.2 | 0 | 0 |
| Peeling strength | g/25 mm | 9 | 9 | 9 | 8 | 9 | 9 | 9 | 8 |

TABLE 1-continued

| | | | | | | | | | |
|---|---|---|---|---|---|---|---|---|---|
| MOR value | | 2.0 | 1.9 | 2.0 | 1.2 | 1.0 | 1.2 | 1.1 | 1.9 |
| (Maximum MOR value − Minimum MOR value) | | 0.3 | 0.1 | 0.2 | 0.2 | 0.2 | 0.3 | 0.3 | 0.3 |
| Retardation (R) value | nm | 1540 | 1860 | 1670 | 120 | 75 | 130 | 190 | 190 |
| State of visual inspection (Influence of light interference under crossed Nicols) | | bad | bad | bad | bad | bad | bad | bad | bad |

Comp. Ex.: Comparative Example
Notes:
Regarding the positions of the film formed, the overall width (2,190 mm) of the film formed was divided into the following three parts (730 mm wide each), B, C and F.
B: Film portion at the left viewed from a take-up position of the film formed
C: Film position at the center viewed from a take-up position of the film formed
F: Film position at the right viewed from a take-up position of the film formed The properties are given on the laminate formed by the silicone coating.

In the film used in Comparative Example 1 and the film used in Example 3, the film formed is divided into three parts in the width direction. That is, the film (B) in Comparative Example 1 is a film portion at the left viewed from the take-up position of the film formed. The films (C and F) in Example 3 are film portions at the center and at the right viewed from the take-up position of the film formed. The films are, though cut in the length direction from the same film formed, thus different in the MOR value and the difference between the maximum and minimum values of the MOR value, presumably because the orientation main axis varies depending on the position due to the bowing phenomenon in the film-forming.

EXAMPLE 4

A biaxially oriented polyethylene-2,6-naphthalenedicarboxylate film was obtained in the same manner as in Example 1, except that polyethylene-2,6-naphthalenedicarboxylate was used instead of polyethylene terephthalate and that the temperature of the rotary cooling drum was set to 50° C. and the thermosetting was conducted under conditions shown in Table 2. Then, a silicone resin coating solution was coated on one surface of the biaxially oriented polyethylene-2,6-naphthalenedicarboxylate film in the same manner as In Example 1. The thus coated film was dried and cured to obtain a release film having a coating thickness of 0.24 µm.

Using the above release film, a laminate was formed with the structure indicated at 1 in FIG. 1, and was measured for various properties. The results are shown in Table 2.

TABLE 2

| Film-forming Conditons & | | Example 4 | | |
|---|---|---|---|---|
| Film Properties | Unit | B | C | F |
| Film formed | | | | |
| Stretch ratio: | | | | |
| longitudinal direction | times | | 3.1 | |
| transverse direction | times | | 4.1 | |
| Crystal thermosetting temp. | | | | |
| zone × 1 | °C. | | 210 | |
| zone × 2 | °C. | | 230 | |
| zone × 3 | °C. | | 180 | |
| Film thickness | µm | | 38 | |
| Film width | mm | | 730 | |

TABLE 2-continued

| Film-forming Conditons & | | Example 4 | | |
|---|---|---|---|---|
| Film Properties | Unit | B | C | F |
| Silicone Coating | | | | |
| Heat shrinkage (longitudinal) (110° C. × 30 min.) | % | 0 | 0 | 0 |
| Heat shrinkage (transverse) (110° C. × 30 min.) | % | 0 | 0 | 0 |
| Peeling strength | g/25 mm | 11 | 12 | 11 |
| MOR value | | 1.5 | 1.4 | 1.5 |
| (Maximum MOR value − Minimum MOR value) | | 0.1 | 0.1 | 0.1 |
| Retardation (R) value | nm | 1220 | 1250 | 1220 |
| State of visual inspection (Influence of light interference under crossed Nicols) | | good | good | good |

What we claim is:

1. A laminate capable of visual inspection for foreign matter and defects comprising in order a polarizing film, a retarded polarizing film or a retardation film, an adhesive layer on one surface of said polarizing film, retarded polarizing film or retardation film, and a release film consisting essentially of a release layer and a transparent biaxially oriented aromatic polyester base film, wherein said laminate is constructed such that (1) a direction of an orientation main axis, as measured by a microwave transmission molecular orientation meter, of the biaxially oriented aromatic polyester base film and (2) a direction of an orientation axis of the polarizing film, the retarded polarizing film or the retardation film are substantially the same or substantially form an angle of 90°, wherein the biaxially oriented aromatic polyester film has an MOR value, as measured by a microwave transmission molecular orientation meter, of 1.3 to 1.8 and the biaxially oriented aromatic polyester film has a retardation (R) value of at least 1,200 nm.

2. The laminate of claim 1, wherein in the biaxially oriented aromatic polyester film, a difference between a maximum value and a minimum value of an MOR value is 0.2 or less.

3. The laminate of claim 1 wherein the biaxially oriented aromatic polyester film has a retardation (R) value, as defined by the following formula (1), of at least 1,200 nm.

$$R = \Delta n \cdot d \quad (1)$$

wherein $\Delta n$ is a difference ($nx - ny$) between a refractive index ($nx$) in a width direction and a refractive index ($ny$) in a direction at right angles with the width direction of the film in a visible light having a wavelength ($\lambda$) of 589 nm, and d is a thickness (nm) of the film.

4. The laminate of claim 1 wherein the release film is a film obtained by subjecting at least one surface of a transparent biaxially oriented aromatic polyester film to treatment of imparting releasability by silicone coating.

5. The laminate of claim 1 wherein the aromatic polyester film is a polyethylene terephthalate film.

6. The laminate of claim 1 wherein the aromatic polyester film is a polyethylene-2,6-naphthalenedicarboxylate film.

7. A release film for inspection of a polarizing film, a retarded polarizing film or a retardation film, which release film consists essentially of a transparent biaxially oriented aromatic polyester base film coated on at least one surface with a silicone resin release layer, said biaxially oriented aromatic polyester film having a MOR value, as measured by a microwave transmission molecular orientation meter, of 1.3 to 1.8, and wherein in the biaxially oriented aromatic polyester film, a difference between a maximum value and minimum value of the MOR value is 0.2 or less and the biaxially oriented polyester film has a retardation (R) value of at least 1,200 nm.

8. The release film of claim 7 wherein the biaxially oriented aromatic polyester film has a retardation (R) value, as defined by the following formula (1), of at least 1,200 nm.

$$R = \Delta n \cdot d \qquad (1)$$

wherein $\Delta n$ is a difference (nx−ny) between a refractive index (nx) in a width direction and a refractive index (ny) in a direction at right angles with the width direction of the film in a visible light having a wavelength ($\lambda$) of 589 nm, and d is a thickness (nm) of the film.

9. The release film of claim 7 wherein the aromatic polyester film is a polyethylene terephthalate film.

10. The release film of claim 7 wherein the aromatic polyester film is a polyethylene-2,6-naphthalenedicarboxylate film.

11. The laminate of claim 1, wherein the polarizing film, the retarded polarizing film and the retardation film are each capable of providing a density of a transmitted light and changing a color shade of the transmitted light in a liquid crystal display.

12. The laminate of claim 1, wherein the release layer comprises a silicone resin coating layer.

13. The laminate of claim 7, wherein the polarizing film, the retarded polarizing film and the retardation film are each capable of providing a density of a transmitted light and changing a color shade of the transmitted light in a liquid crystal display.

14. A laminate capable of visual inspection for foreign matter and defects consisting essentially of in order a polarizing film, a retarded polarizing film or a retardation film, an adhesive layer on one surface of said polarizing film, retarded polarizing film or retardation film, and a release film consisting essentially of a release layer and a transparent biaxially oriented aromatic polyester base film, wherein said laminate is constructed such that (1) a direction of an orientation main axis, as measured by a microwave transmission molecular orientation meter, of the biaxially oriented aromatic polyester base and (2) a direction of an orientation axis of the polarizing film, the retarded polarizing film or the retardation film are substantially the same or substantially form an angle of 90°, wherein the biaxially oriented aromatic polyester film has an MOR value, as measured by a microwave transmission molecular orientation meter of 1.3 to 1.8, a difference between a maximum value and a minimum value of an MOR value is 0.2 or less and the biaxially oriented aromatic polyester film has a retardation (R) value, as defined by the following formula (1), of at least 1,200 nm.

$$R = \Delta n \cdot d \qquad (1)$$

wherein $\Delta n$ is a difference (nx−ny) between a refractive index (nx) in a width direction and a refractive index (ny) in a direction at right angles with the width direction of the film in a visible light having a wavelength ($\lambda$) of 589 nm, and d is a thickness (nm) of the film.

15. The laminate of claim 14, wherein the aromatic polyester film is a member selected from the group consisting of a polyethylene terephthalate film and a polyethylene-2,6-naphthalenedicarboxylate film.

* * * * *